United States Patent

[11] 3,568,183

[72] Inventors Jacob K. Snell;
John J. Larew; Clifford M. Jones,
Waynesboro, Va.
[21] Appl. No. 743,470
[22] Filed July 9, 1968
[45] Patented Mar. 2, 1971
[73] Assignee General Electric Company

[54] KEYBOARD SYNCHRONIZED TONED GENERATOR
18 Claims, 6 Drawing Figs.

[52] U.S. Cl. .......... 340/365, 340/384, 178/17, 178/81
[51] Int. Cl. .......... H04l 15/12
[50] Field of Search .......... 340/365, 384 (E); 178/17, 17 (C), 81, 69.5

[56] References Cited
UNITED STATES PATENTS

| | | | |
|---|---|---|---|
| 3,296,369 | 1/1967 | Clark .......... | 340/365X |
| 3,308,236 | 3/1967 | Jones .......... | 178/17X |
| 3,454,717 | 7/1969 | Peters .......... | 178/17X |

*Primary Examiner*—Ralph D. Blakeslee
*Attorneys*—Lawrence G. Norris, Michael Masnik, Frank L. Neuhauser, Oscar B. Waddell and Melvin M. Goldenberg

ABSTRACT: In a keyboard printer arrangement utilizing the multibit, binary coded digital signals representative of the printable symbols associated with an operated key to generate separate sounds synchronized with key operation and audibly distinguishable from nonsynchronized or changing printing sounds.

INVENTORS
JACOB K. SNELL
JOHN J. LAREW
CLIFFORD M. JONES
BY Michael Masnik
THEIR ATTORNEY INVENTORS
JACOB K. SNELL
JOHN J. LAREW
CLIFFORD M. JONES
BY Michael Masnik
THEIR ATTORNEY INVENTORS
JACOB K. SNELL
JOHN J. LAREW
CLIFFORD M. JONES
BY
Michael Masnik
THEIR ATTORNEY

KEYBOARD SYNCHRONIZED TONED GENERATOR

BACKGROUND OF THE INVENTION

The present invention is directed to a keyboard-operated printing system and more particularly to an arrangement for signalling the operation or depression of keys on the keyboard.

In the information-processing field the use of digital coding schemes has become an acceptable method and means for transmitting information by and between devices such as remote terminals, computers, telephone lines, or other similar devices. In most information-processing systems, the information to be processed is generally introduced into the the system from a keyboard which translates the information into an appropriate digital code. Externally, the keyboard undergoes appears much like the keyboard of a typewriter. Internally the keyboard undergoes a translation or encoding process whereby actuation of a key causes the generation of a digital code peculiar to the character or legend on the key.

To achieve the extremely high-speed printing that is required for compatibility with automatic data transmission systems now coming into being, it is essential to have printing apparatus that can respond with a minimum delay to the input date available from the keyboard. Greater printing speed is attained with systems which provide a buffer storage between the incoming data and the printing mechanism. With this apparatus, continuously moving type elements periodically pass adjacent each print position of a recording medium and they are activated under control of an electronic storage means that stores all of the characters required to print a full line. The latter apparatus has been developed with rotating drums and also with a chain or belt which carries the type elements and moves across the recording medium at a continuous speed.

U.S. Pat. application Ser. No. 734,501 filed Jun. 14, 1968, by Earle B. McDowell and Clifford M. Jones (45-SL-0-1033), discloses an improvement over conventional line printers wherein a storage unit is employed which does not store all data for an entire line; but, rather, stores only a sufficient number of characters for the required speed of operation. The apparatus for the cited copending patent application utilizes a type-carrying belt that carries a number of flexible arms, each of which has the type for a particular character on one end thereof. The number of arms carried on the belt depends upon the number of characters or symbols the apparatus is to print. The type-carrying belt is mounted upon drive devices which rotate about parallel axes in order to effect passage of the belt between the recording medium and a plurality of hammers across the entire face of the recording medium. The position of each character relative to a fixed point on the printer, is determined by detecting the passage of a particular character past that point and thereafter triggering a counting mechanism at a rate proportional to the rate of character movement. As the characters on the belt move past each possible column position on the recording medium, circuitry compares the column position with the stored input data available from the keyboard to determine whether or not a character is to be presented at that column position and whether or not that character is presently in position. When this comparison indicates coincidence between the character on the belt and the character desired to be printed at that column, the hammer at that column position is actuated and urges the character-bearing arm to impact the type face on the recording medium and impress a replica of the character thereon.

In the aforementioned arrangements, hammer impact and the related audible sounds may occur a substantial time after key depression or operation. Thus operators, trained in operating a standard typewriter wherein the printing is audibly noticed at approximately the same speed as key operation, may find difficulty in operating the high-speed printers where there is no such simultaneity. Even further difficulty may arise when the differences in timing of the two events continuously varies. Furthermore, if the operator should type faster than any successive occurrences of hammer impact, even more confusion and discomfort is experienced.

SUMMARY OF THE INVENTION

It is therefore an object of this invention to provide an improved signal processing arrangement involving keyboard operation.

It is a further object of this invention to generate separate sounds synchronized with the key operation of a printer and audibly distinguishable from nonsynchronous or changing print hammer impact sounds.

It is a further object of this invention to generate sounds synchronized with key operation and having audible characteristics distinguishable from print hammer impact sounds.

It is a further object of this invention to provide an improved arrangement for signalling the operation or depression of keys on a keyboard.

It is a further object of this invention to generate sounds synchronized with key depression or operation and which may be modified to suit the audible desires of the operator of the keyboard.

Briefly, these objects and others are achieved according to one embodiment of the invention applicable to operation of a key in a printer keyboard which causes the generation of multibit, binary coded digital signals representative of the printable symbol associated with the key. When a predetermined one of said binary values is detected at predetermined bit times or locations, there is provided an audible sound of controllable frequency, and/or wave shape and/or volume.

BRIEF DESCRIPTION OF THE DRAWINGS

The subject matter of the invention is particularly pointed out and distinctly claimed in the concluding portion of the specification. For a complete understanding of one embodiment of the invention together with other objects and advantages thereof, reference should be made to the following description taken in conjunction with the accompanying drawings in which:

DETAILED DESCRIPTION OF THE INVENTION

Figure 1:
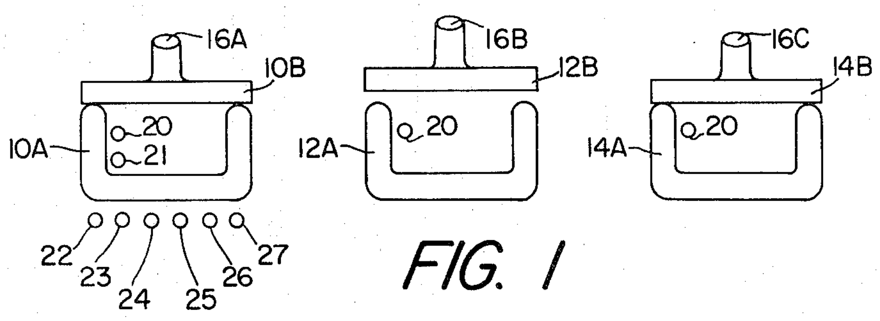
FIG. 1 is a schematic drawing of a portion of a keyboard showing magnetic cores and the threading of sets of electrical conductors through the cores.

As shown in FIG. 1, three ferrite type magnetic cores 10, 12 and 14 are provided, each in two discrete parts. Each magnetic core consists of a bottom portion depicted as the U cores 10A, 12A, and 14A, and a top portion depicted by I bars represented by the numerals 10B, 12B and 14B. Each I bar is secured to an individual key 16 on the keyboard, which key represents a unique character, legend or item of information. The use of ferrite cores in two discrete parts allows for the opening and closing of the magnetic path by separation and mating of a U core with an I bar. Closure of the magnetic path by depression of a key will cause established magnetic flux lines to flow through the mating cores. Opening of the magnetic path by release of a key introduces a substantial air gap in the magnetic path in the regions at the terminal portions of the I bars. The magnetic flux lines which flow through mating cores may be produced by providing a drive line 20 which links each U core on the keyboard, and by supplying current pulses over the drive line 20 to cause flux lines to be magnetically induced through mating cores.

The generation of digital codes peculiar to each item of information may be achieved by providing a first set of electrical conductors, or sense lines 21—27 which thread the cores in combinations to provide a different code for each item of information. By way of example the seven sense lines 21—27 generate a seven bit code. According to the coding scheme the binary level 1 is represented by a sense line that is threaded through a core and the binary level 0 is represented by a sense line running around a core and thus not coupled to the drive line 20. Each sense line represents a certain binary value in the coding scheme, and hence each of the lines 21—27 passes through some cores and around others. For example, in FIG. 1, only the sense line 21 passes through the core 10. If sense line 21 represents the lowest binary value, then depression of the key 16A and energization of drive line 20 with a current pulse will cause a signal to be induced only over the sense line 21 and the digital code for key 16A will be the value 1. The number and weight of the sense line(s) that pass through each core determine the digital code produced for that core. The digital code is generated for each item of information by depression of a key which causes closure of the air gap between the "I" bar and "U" core. Then, the current pulses over drive line 20 will cause the magnetic flux lines produced by the drive line to flow through the magnetic path completed by the "I" bar and "U" core. These magnetic flux lines induce a voltage in the sense lines which are threaded through the core.

Figure 2:
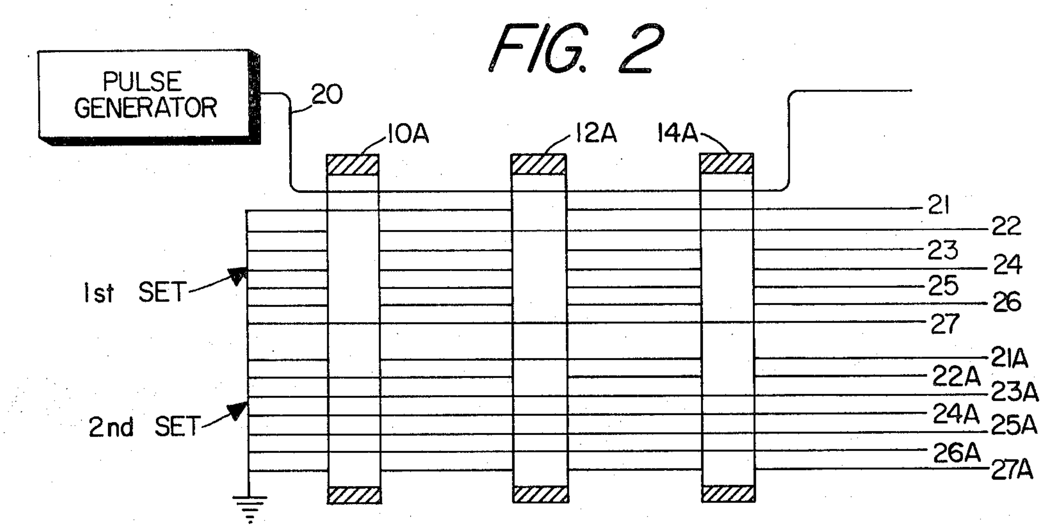
FIG. 2 is a schematic drawing showing one form of the threading scheme.
Figure 3:
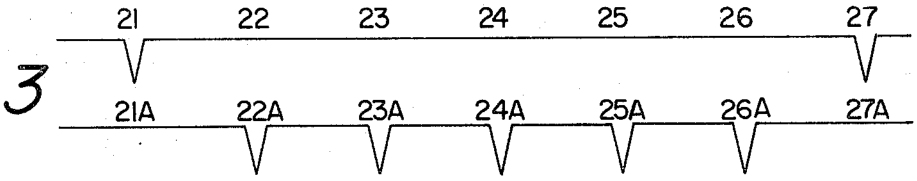
FIG. 3 shows a typical digital code and inverse code provided when a single key is depressed.

FIG. 2 discloses one form of threading the cores which may be provided in a two keys down detector system. As shown in FIG. 2, a first set of electrical conductors or sense line 21—27 threads the cores in combinations to provide a digital code as hereinbefore described. A second set of electrical conductors or sense lines 21A—27A threads the cores in a sense which is opposite to the threading scheme of the first set of electrical conductors 21—27. Hence, sense line 21 of the first set threads through the core 10, around core 12 and through core 14, while associated sense line 21A of the second set is threaded around the core 10, through core 12 and around core 14 to provide a sense opposite to that of the sense line 21. Similarly, sense line 22 of the first set threads around core 10, through the core 12, and through core 14; associated sense line 22A of the second set threads through core 10, around core 12 and around core 14 to provide a sense opposite to that of the sense line 22. Each sense line of the first set of electrical conductors 21—27 is associated with a sense line 21A—27A of the second set of electrical conductors. The sense lines of the first set of electrical conductors provide the true digital code for each key 16 that is depressed, while the sense lines of the second set of electrical conductors provide the inverse of the digital code provided by the sense lines of the first set. FIG. 3 shows a typical digital code and inverse code provided by the respective sets of sense lines when a single key 16 is depressed. Each impulse represents the binary level "1" for the sense lines threaded through the core and the absence of an impulse represents the binary level "O" for the sense lines threaded around the core.

Figure 4:
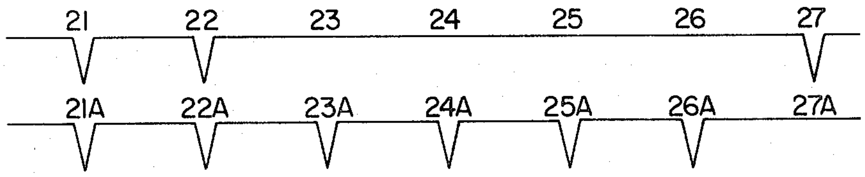
FIG. 4 shows a changed digital code and inverse code provided when more than one key is depressed.

FIG. 4 shows a typical changed code and inverse code produced when more than one key is depressed. As shown in FIG. 4, the code and inverse codes produced by the sets of conductors 21—27 and 21A—27A have changed logic levels due to the simultaneous depression of the keys 16A and 16B at core 10 and core 12. By depressing key 16A the binary level 1 is established over sense lines 21 and 22A, and by depressing key 16B the binary level 1 is established over the sense lines 21A and 22. This two keys down condition has caused erroneous code and inverse code levels to be generated during the time when both keys are simultaneously depressed, since the digital code for the item of information represented by the key 16A should have a binary level 0 over sense line 22 and a binary level 0 over sense line 21A, and the digital code for the item of information represented by the key 16B should have a binary level 0 over sense line 21 and a binary level 0 over sense line 22A.

Figure 5:
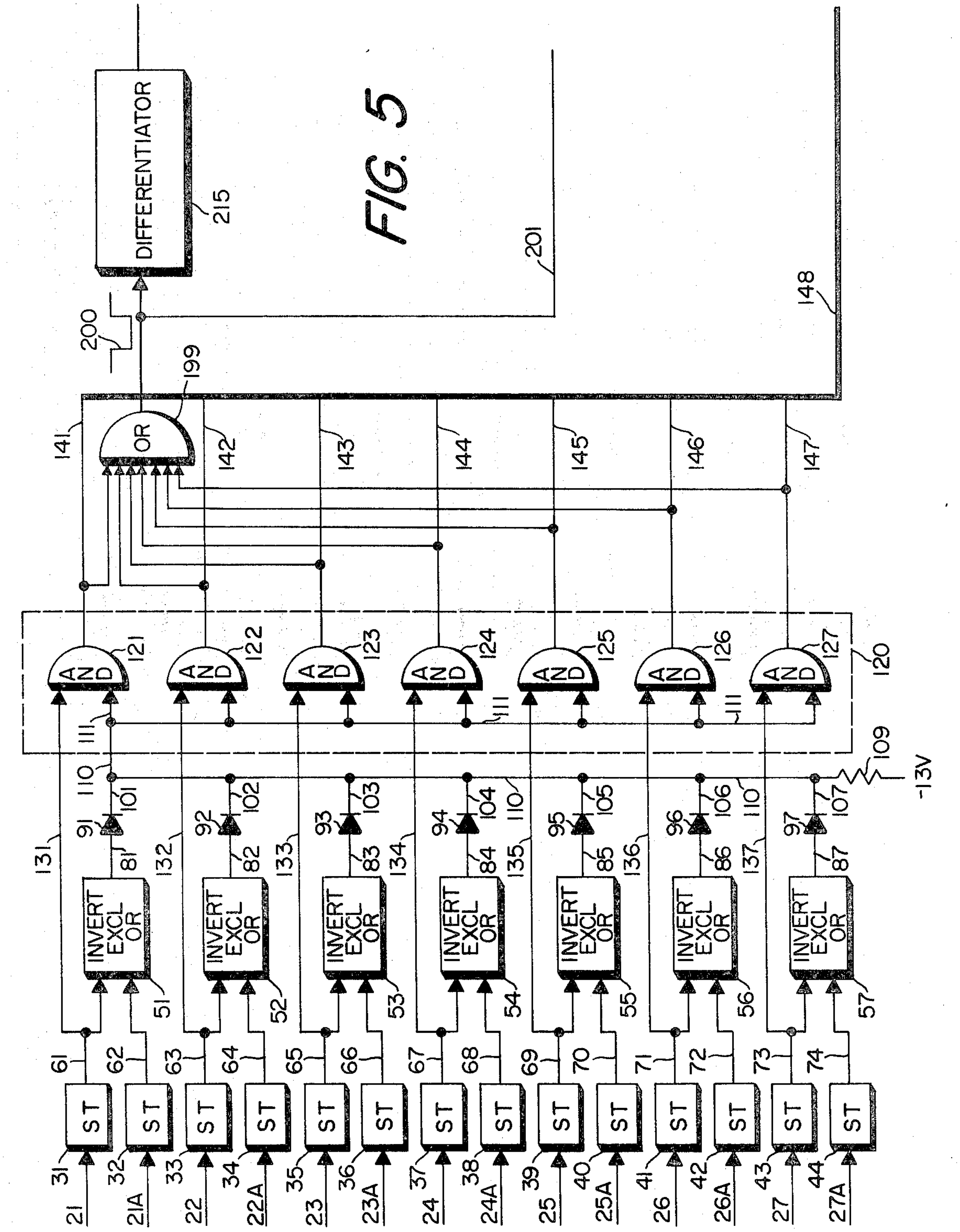
FIG. 5 and 5A shows a part-schematic drawing, part-block diagram showing one embodiment of the invention for signalling the time of operation or depression of keys on a keyboard where associated printer hammer operation occurs with a different timing.

As shown in FIG. 5 each of the sense lines 21—27 of the first set, and its associated sense line 21A—27A of the second set are intercoupled to an input of individual Schmitt Trigger circuits depicted by the numerals 31—44 inclusive. Each Schmitt Trigger circuit 31—44 is a regenerative bistable circuit which squares and amplifies the voltage established over the sense lines. The output from each of the circuits 31—44 may be at −12 volts for a binary level 1 input from the sense line and may be at zero (0) volts for a binary level 0 input.

The thusly modified output signals from a pair of associated sense lines may be intercoupled to inputs of individual gate circuits 51—57. By way of example the modified output derived from sense line 21 is applied over conductor 61 from Schmitt Trigger 31 to one input of gating circuit 51, and the modified output derived from associated sense line 21A is applied over conductor 62 from Schmitt Trigger 32 to the other input of gating circuit 51. In a like manner, conductors 63 and 64 apply the modified outputs from associated sense lines 22 and 22A respectively to first and second inputs of gating circuit 52. Similarly, each of the conductors 65—66, 67—68, 69—70, 71—72, and 73—74 apply modified outputs from associated sense lines 23 and 23A, 24 and 24A, 25 and 25A, 26 and 26A, and 27 and 27A respectively to first and second inputs of gating circuits 54, 55, 56 and 57 respectively.

Each of the gate circuits 51—57 may consist of an exclusive OR gate inverted to provide compatibility with the specific logic scheme utilized. Each OR gate provides a strobe output over respective conductors 81—87 when one input is at the binary level "O" and the other input is at the binary level 1. The strobe output may be at a first level of −13 volts, and indicates that the code and inverse code signals for the associated pair of sense wires have been generated by depression of a single key. However, any one of the OR gates 51—57 will provide a $\overline{\text{STROBE}}$ output which may be at a second level of zero volts when the inputs to that OR gate are either both at the binary level 1 or both at the binary level 0. Due to the code and inverse code scheme this condition can only occur when at least two keys are simultaneously depressed since, as hereinbefore described, depression of two or more keys results in a code change for at least one bit. Each of the output conductors 81—87 may be connected to the anode of respective diodes 91—97, and the cathode of diodes 91—97 may be connected to one terminal of respective conductors 101—107. The other end of conductors 101—107 may be connected to a common conductor 110, which has one end coupled to −13 volts through pull down resistor 109. In this manner diodes 91—97 and resistor 109 comprise a seven input AND gate with an output over conductor 110 (i.e., −13 volts) only when all OR outputs are 1 which occurs only when a single key is depressed or when no key is depressed. When more than one key is depressed the output 110 will be at zero volts.

Also depicted in FIG. 5 is character gating means 120 which may consist of a plurality of AND gates 121—127, equal in number to the number of data code lines in each set of electrical conductors. One input of each AND gate may be connected to the strobe output line by means of common conductor 110. The other input to each AND gate may be intercoupled to an output derived from first set of sense lines 21—27, by interconnecting conductors 131—137 to respective outputs of Schmitt Trigger circuits 31, 33, 35, 37, 39, 41 and 43. In this manner character gating means 120 will receive the digital code generated over first set of sense lines 21—27 and will pass said code over conductors 141—147 and the communication channel, such as cable 148, to the printer mechanism (to be described shortly) in response to presence of the code over conductors 131—137 and a strobe signal over conductor 110. When a $\overline{\text{STROBE}}$ signal, indicative of depression of more than one key, is present, the digital code will not be passed since the inputs to each AND gate 121—127 will be at different levels.

Any digitally coded signals available on conductors 141 through 147 are also applied to the input of an OR gate 199. OR gate 199 operates in response to the appearance of a bit of a predetermined one of the binary values, such as logic 0 or logic 1, to produce an output control pulse or strobe 200 on lead 201. In a particular embodiment where logic 0 was represented by zero volts and logic 1 by −10 volts, the strobe signal appeared as a −10 volt signal 200 on lead 201. This strobe signal, as will be disclosed shortly, is employed to produce the audible sound associated with individual key operation.

The multibit binary coded digital signals available on leads 141 through 147 and channel 148, and representative of predetermined key operation is applied over channel 148 to the printer mechanism.

Figure 5A:
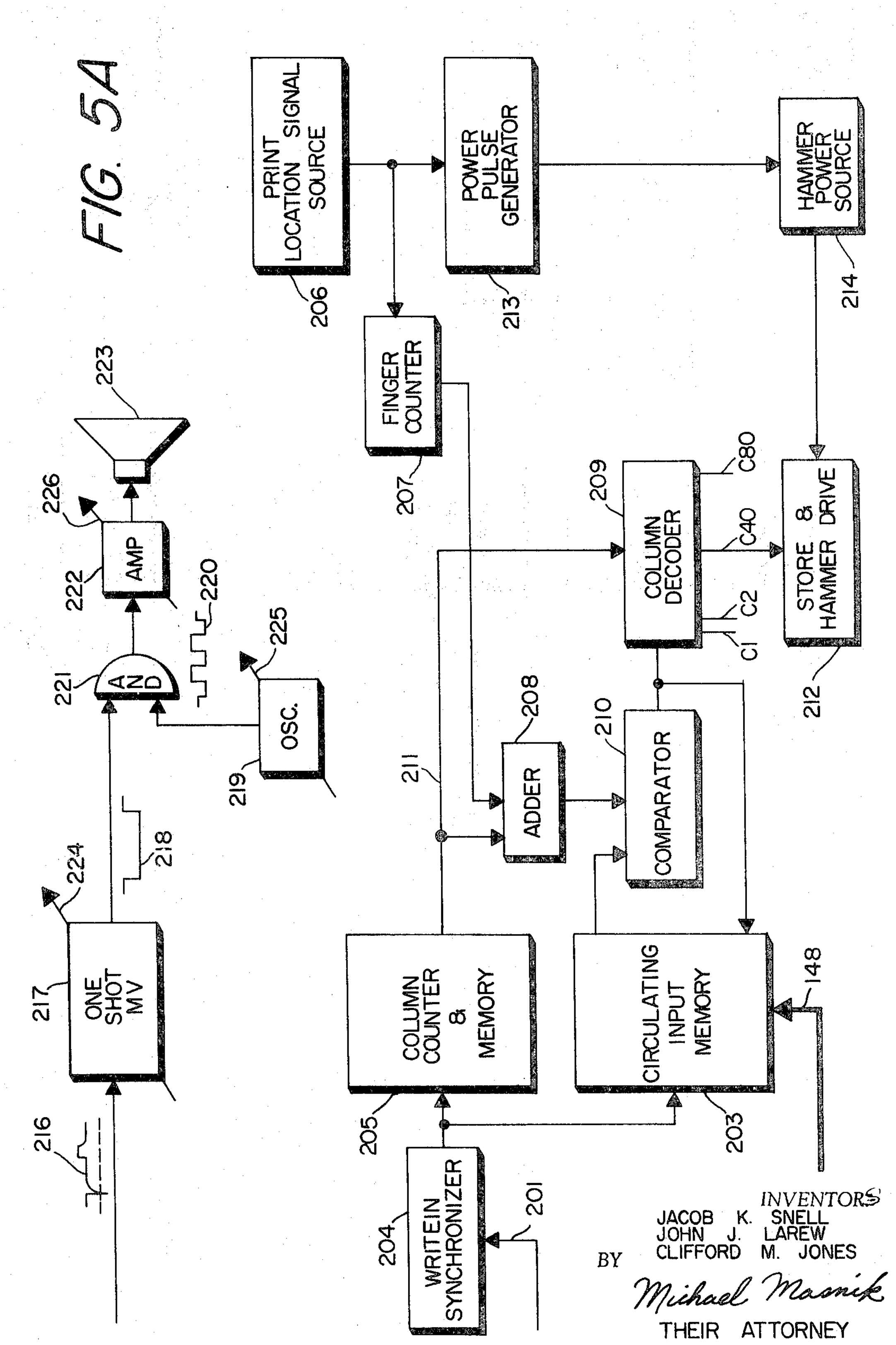

Details of one embodiment of a printer permitting partial line printing of several characters at a time is disclosed in the copending application of Clifford M. Jones et al., filed Jun. 4, 1968, entitled Print Selection System and assigned to the common assignee. In this embodiment, referring to FIGS. 5 and 5A, the input memory accepts a plurality of groups of the coded signals representative of a plurality of characters, and circulates them at a given rate. Write-in synchronizer 204 responds to the strobe signal available on lead 201, representing each accepted character, to permit the acceptance of the data into memory and to advance the column counter 205 to the next column count position in response to each accepted character. In the particular embodiment under discussion, the printable characters occur as print-carrying elements or fingers which are caused to pass along a line of print represented by various column positions. In order to achieve proper printing action, print character location signal source 206 is arranged to develop a signal every time a type carrying finger passes a predetermined reference point. Finger counter 207 responds to the incoming pulses from 206 to continuously provide an indication of the current print finger number in a given location. In order to achieve a print condition, the characters circulating in input memory 203 must be matched with the instantaneous position of the type elements defined by the signals from source 206 at the column location established by the column counter memory 205. In the preferred embodiment, this is accomplished by adding the finger counter number with the column count number from 205 in the adder circuit 208. Column decoder 209 responds to an enabling signal received from the comparator circuit 210 indicating that a favorable comparison between the outputs of adder 208 and circulating memory 203 has occurred, to operate and decode the column count signal available on lead 211. Column decoder 209 then energizes its particular output leads C1 through C80 to bias or precondition the particular hammer drive circuits 212 which are to be operating simultaneously to print the proper characters at the proper column position. Pulse generator 213 responds to the print character location signals available from 206 to generate a power pulse. This pulse occuring each time an element passes a predetermined reference point is applied to a power source 214 to produce a pulse of sufficient energy to drive the hammer circuits 212 which have been previously conditioned or biased by the operation of the column decoder 209. Thus, in the first portion of the time interval between successive print character location signals associated with successive finger passages and available from 206, a plurality of characters have been circulated through memory 203 and a biasing or conditioning signal has been established on the particular leads C1 through C80 associated with the particular hammers to be driven for printing action. In the balance of the period between the aforementioned character location signals, power supplied from 214 causes the preconditioned hammers in the drive arrangement 212 to be propelled to drive the type-carrying elements into a recording medium and obtain printing of the proper characters at the desired column locations. It should be noted that depending upon circumstances, none, some, or all of the characters being circulated in the input memory may be printed at any one time. The printing sounds being audible, and occurring with a changing timing as compared to individual key operation, presents problems and difficulties to the keyboard operator. In order to overcome this, the strobe signal available on lead 201 and occurring substantially synchronously with key operation is used to provide an audible tone distinguishable from the printing sounds. In a particular embodiment, this signal is supplied to a differentiating circuit 215 which differentiates the incoming negative going signal to produce the differentiated pulse pattern 216. Only the differentiated portion representing the negative going portion of 200 is used. This differentiated portion operates a one-shot multivibrator 217 to produce a gating pulse of predetermined duration such as shown at 218. Tone generator or oscillator 219 provides an audible sound of predetermined frequency shown as 220 which is applied to the AND gate 221. AND gate 221 responds to the gating pulse 218 to pass the audible tones or signals from 220 to the amplifier 222 for the duration of pulse 218. The amplified, passed audible signals are then applied to the speaker 223 to provide an audible sound substantially synchronized with key operation. Thus, it is seen by employing some of the circuitry used in printing, signals may be generated which prove useful to an operator for discriminating between key operation and nonsynchronous print hammer sounds. Depending on operator preferences and environmental conditions, it may be desirable to control the amplitude, the frequency and also the duration of the generated audible sounds. Thus, multivibrator 217 is provided with a means 224 to control its particular parameters which affect pulse output duration. Similarly, oscillator 219 is provided with a control 225 to control its determining parameters. Amplifier 222 is provided with a control 226 to control its output amplitude or intensity determining parameter before application to speaker 223.

While this invention has been described with respect to preferred embodiment and several illustrative examples thereof, it is clearly understood by those skilled in the art that the invention is not limited thereto and that the preferred embodiment merely is for illustrative purposes. Thus, depending upon the particular signal coding employed, only the signals available on predetermined ones of the leads 141—147 may be employed to generate the audible tones. Also, where multiple key operations are not a problem, coded signals without the related processing may be employed. The speaker 223 may be replaced by other signal-indicating devices. The invention is intended to be bounded only by the limits of the appended claims.

While only a particular embodiment of the invention has been fully described and illustrated, it is apparent that modifications and alternations may be made therein. Hence, it is the intention in the appended claims to cover all such modifications and alterations as may fall within the true spirit and scope of the invention.

We claim:

1. In a printer arrangement wherein the times of operation of keys on a operation is associated with print hammer operations which provide first sounds audibly recognizable by the keyboard operator as being of different timing than the times of operation of said keys, an arrangement comprising means responsive to key operation for producing audible second sounds substantially synchronous with each key operation which are audibly distinguishable from said first sounds.

2. An arrangement according to claim 1 further comprising means for changing the audible characteristics of said second sounds.

3. An arrangement according to claim 2 wherein said means for varying comprises means for varying intensity of said second sounds to suit the needs of the keyboard operator.

4. An arrangement according to claim 1 wherein said means for producing second sounds comprises means for producing a multibit, binary coded signal representative of a printable symbol associated with each key, each of said plurality of bits being presented on an individual line, and means responsive to predetermined values of such signals being presented at said lines to provide said second sounds.

5. An arrangement according to claim 4 wherein said predetermined ones of said lines comprises any one or more of said lines.

6. In a printer arrangement wherein the times of operation of keys on a keyboard is associated with print hammer operations which provide sounds audibly recognizable by the keyboard operator as being of different timing than the times of operation of said keys, means responsive to operation of each key to provide a coded signal representative of the printable symbol associated with the operated key, means responsive to such coded signals to print the associated printable symbols, and means responsive to each of said coded signals to provide separate audible signals indicative of the time of operation of each of said associated keys.

7. An arrangement according to claim 6 further comprising means for changing the audible characteristics of said audible signals to distinguish them from said print hammer sounds.

8. An arrangement according to claim 7 wherein said means for changing comprises means for changing the frequency content of said audible signals.

9. An arrangement according to claim 7 wherein said means for changing comprises means for changing the duration of each of said audible signals.

10. In an arrangement wherein the operation of the individual keys on the keyboard occurs with one timing and the printing of individual symbols associated with the operation of each key occurs with a different timing, means for producing sounds which are audibly recognizable by the keyboard operator as occurring substantially synchronously with each key operation, comprising means responsive to operation of each key to provide a multibit, binary coded digital signal representative of the printable symbol associated with the operated key, means responsive to signals representing the successive operation of a plurality of keys to thereafter print the printable symbols associated with each of a plurality of such operated keys simultaneously, and means responsive to a predetermined one of the two states associated with predetermined bits of the signals associated with each of said plurality of operated keys to provide audible sounds.

11. An arrangement according to claim 10 wherein said means for producing audible sounds comprises means for producing a multibit, binary coded decimal signal representative of a printable symbol associated with each key with each of said plurality of bits being presented on individual lines, and means responsive to a predetermined one of the two states associated with the bits of such signal being presented at predetermined ones of said lines to provide said audible sounds.

12. In combination, a keyboard comprising a plurality of operable keys, means responsive to operation of each key to provide a multibit, binary coded, digital signal representative of a printable symbol associated with the operated key, means responsive to signals representing the successive operation of a plurality of keys to print the printable symbols associated with each of said plurality of operated keys, means responsive to at least one of the binary values of the signals associated with each of said plurality of operated keys to provide separate signals indicative of the time of operation of each of said keys.

13. In combination, a keyboard comprising a plurality of operable keys, means responsive to operation of each key to provide a multibit, binary coded, digital signal representative of a printable symbol associated with the operated key, means responsive to signals representing successive operations of a plurality of keys for thereafter printing the printable symbols associated with such signals and for signalling the time of operation of each key associated with such symbols, and means responsive to the simultaneous operation of more than one key to prevent the printing and key operation signalling.

14. An arrangement according to claim 13 further comprising means responsive to the release of the next to last key to be released to permit the printing and key operation signalling associated with said last to be released key.

15. An arrangement according to claim 14 wherein said means for signalling comprises means for presenting each of said plurality of bits on an individual line, and means responsive to a predetermined one of the two states associated with the bits being presented at predetermined ones of said lines to provide audible sounds.

16. In combination, a keyboard comprising a plurality of operable keys, means responsive to operation of each key to provide a multibit, binary coded digital signal representative of a symbol associated with the operated key, means responsive to signals representing the successive operation of a plurality of keys to communicate the symbols associated with each of said plurality of operated keys to a remote location, and means responsive to at least one of the binary values of the signals associated with each of said plurality of operated keys to provide separate signals indicative of the time of operation of each of said keys.

17. In combination a keyboard comprising a plurality of operable keys, means responsive to operation of each key to provide a multibit, binary coded, digital signal representative of a symbol associated with the operated key, means responsive to signals representing successive operations of the plurality of keys for thereafter communicating said signals and for separately signaling the time of operation of each key associated with such symbols, and means responsive to the simultaneous operation of more than one key to prevent of communicating and said separate signaling.

18. A signal processing arrangement comprising a plurality of symbol keys on a keyboard, means for depressing said keys to establish a unique coded signal representative of the symbol associated with each of the depressed keys, means for translating an established coding signal when only one of said keys is depressed, means responsive to more than one key being currently depressed to inhibit translation of any established code signals associated with said depressed keys but responsive to the last to be released key for translating the established coded signal associated with said last named key, and means responsive to translated established binary coded signals for signaling the operation of each key associated with said last named symbols.

UNITED STATES PATENT OFFICE
CERTIFICATE OF CORRECTION

Patent No. 3,568,183 Dated March 2, 1971

Inventor(s) Jacob K. Snell, John J. Larew and Clifford M. Jones

It is certified that error appears in the above-identified patent and that said Letters Patent are hereby corrected as shown below:

Column 1, line 22, after "with" insert -- the; line 25, cancel "c and insert -- data; line 36, cancel "Jun. 14" and insert -- June 4 --; line 42, cancel "for" and insert -- of --. Column 6, line 57, cancel "operation" and insert -- keyboard --. Column 8, line 43, cancel "of" (second occurrence) and insert -- said --.

Title should be -- KEYBOARD SYNCHRONIZED TONE GENERATOR --.

Signed and sealed this 14th day of December 1971.

(SEAL)
Attest:

EDWARD M.FLETCHER,JR.
Attesting Officer

ROBERT GOTTSCHALK
Acting Commissioner of Pa